United States Patent
Zeiher et al.

(10) Patent No.: US 6,838,001 B2
(45) Date of Patent: Jan. 4, 2005

(54) METHOD OF MONITORING MEMBRANE SEPARATION PROCESSES

(75) Inventors: E. H. Kelle Zeiher, Naperville, IL (US); Bosco P. Ho, Wheaton, IL (US); John E. Hoots, St. Charles, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 10/722,750

(22) Filed: Nov. 26, 2003

(65) Prior Publication Data

US 2004/0104171 A1 Jun. 3, 2004

Related U.S. Application Data

(63) Continuation of application No. 10/109,256, filed on Mar. 28, 2002.

(51) Int. Cl.$^7$ .............................................. B01D 61/12
(52) U.S. Cl. ................... 210/639; 210/636; 210/652; 210/745; 436/164; 436/172
(58) Field of Search .................. 210/94, 636, 639, 210/650, 652, 709, 739, 745; 422/14, 62, 82.05, 82.08, 82.09; 436/164, 172

(56) References Cited

U.S. PATENT DOCUMENTS

| | | |
|---|---|---|
| 4,783,314 A | 11/1988 | Hoots et al. |
| 4,992,380 A | 2/1991 | Moriarty et al. |
| 5,171,450 A | 12/1992 | Hoots |
| 5,242,602 A | 9/1993 | Richardson et al. |
| 5,260,386 A | 11/1993 | Fong et al. |
| 5,320,967 A | 6/1994 | Avallone et al. |
| 5,411,889 A * | 5/1995 | Hoots et al. .................... 436/6 |
| 5,416,323 A | 5/1995 | Hoots et al. |
| 5,435,969 A | 7/1995 | Hoots et al. |
| 5,460,723 A * | 10/1995 | Bourbigot et al. .......... 210/639 |
| 5,589,076 A * | 12/1996 | Womack ...................... 210/739 |
| 5,714,387 A | 2/1998 | Fowee et al. |
| 6,113,797 A | 9/2000 | Al-Samadi |
| 6,329,165 B1 | 12/2001 | Chattoraj et al. |

FOREIGN PATENT DOCUMENTS

JP   10-282410   4/2000

OTHER PUBLICATIONS

Osmonics, The Filtration Spectrum, Copyright 1998 by Osmonics, Inc. Minnnetonka, Minnesota, USA Corporate Headquarters, 5951 Clearwater Drive, Minnetonka, Minnesota 55343–8995 USA.

* cited by examiner

Primary Examiner—Joseph Drodge
(74) Attorney, Agent, or Firm—Michael B. Martin; Thomas M. Breininger

(57) ABSTRACT

Methods and systems for monitoring and/or controlling membrane separation systems or processes are provided. The present invention utilizes measurable amounts of inert fluorescent tracer(s) added to a feed stream to evaluate and/or control the purification of such feed stream during membrane separation. The methods and systems of the present invention can be utilized in a variety of different industrial applications including raw water processing and waste water processing.

21 Claims, No Drawings

METHOD OF MONITORING MEMBRANE SEPARATION PROCESSES

CROSS-REFERENCE TO RELATED PATENT APPLICATION

This patent application is a continuation of U.S. patent application Ser. No. 10/109,256, filed Mar. 28, 2002, now pending.

FIELD OF THE INVENTION

This invention relates generally to membrane separation and, more particularly, to methods for monitoring and/or controlling membrane separation processes.

BACKGROUND OF THE INVENTION

Membrane separation, which uses a selective membrane, is a fairly recent addition to the industrial separation technology for processing of liquid streams, such as water purification. In membrane separation, constituents of the influent typically pass through the membrane as a result of a driving force(s) in one effluent stream, thus leaving behind some portion of the original constituents in a second stream. Membrane separations commonly used for water purification or other liquid processing include microfiltration (MF), ultrafiltration (UF), nanofiltration (NF), reverse osmosis (RO), electrodialysis, electrodeionization, pervaporation, membrane extraction, membrane distillation, membrane stripping, membrane aeration, and other processes. The driving force of the separation depends on the type of the membrane separation. Pressure-driven membrane filtration, also known as membrane filtration, includes microfiltration, ultrafiltration, nanofiltration and reverse osmosis, and uses pressure as a driving force, whereas the electrical driving force is used in electrodialysis and electrodeionization. Historically, membrane separation processes or systems were not considered cost effective for water treatment due to the adverse impacts that membrane scaling, membrane fouling, membrane degradation and the like had on the efficiency of removing solutes from aqueous water streams. However, advancements in technology have now made membrane separation a more commercially viable technology for treating aqueous feed streams suitable for use in industrial processes.

Furthermore, membrane separation processes have also been made more practical for industrial use, particularly for raw and wastewater purification. This has been achieved through the use of improved diagnostic tools or techniques for evaluating membrane separation performance. The performance of membrane separation, such as efficiency (e.g. flux or membrane permeability) and effectiveness (e.g. rejection or selectivity), are typically affected by various parameters concerning the operating conditions of the process. Therefore, it is desirable to monitor these and other types of process parameters specific to membrane separation to assess the performance of the process and/or the operating conditions. In this regard, a variety of different diagnostic techniques for monitoring membrane separation processes have been routinely used and are now understood and accepted as essential to its practicality and viability for industrial use.

However, monitoring is typically conducted on an intermittent basis, for example, once a work shift or at times less frequently. Known employed monitoring techniques can also be labor and time intensive. Thus, adjustments made to membrane separation processes in order to enhance performance based on typical monitoring may not be made in an expeditious manner. In addition, the presently available monitoring techniques often do not provide optimal sensitivity and selectivity with respect to monitoring a variety of process parameters that are generally relied on as indicators to evaluate and/or control membrane separation processes.

For example, monitoring techniques typically applied to reverse osmosis and nanofiltration include conductivity measurements and flow measurements. Conductivity measurements are inherently less accurate in order to determine the recovery of solutes which are substantially retained by the membrane. In this regard, conductive salts, typically used as indicators during conductive measurements, can pass through the membrane. Since salts generally pass through the membrane as a percentage of the total salt concentration, changes in local concentration due to concentration gradients or the like can change the conductivity of the product water without necessarily indicating membrane damage. This is especially true in the last stage of a multi-stage cross flow membrane system where salt concentrations (and, therefore, passage of salts as a percentage of that concentration) reach their highest levels. In this regard, the salt passage/percent rejection parameter is generally determined as an average value based on values measured during all stages of the membrane system.

Further, flow meters generally employed in such systems are subject to calibration inaccuracies, thus requiring frequent calibration. Moreover, typical monitoring of reverse osmosis and other membrane separations can routinely require the additional and/or combined use of a number of different techniques, thus increasing the complexity and expense of monitoring.

Accordingly, a need exists to monitor and/or control membrane separation processes which can treat feed streams, such as aqueous feed streams, suitable for use in industrial processes where conventional monitoring techniques are generally complex and/or may lack the sensitivity and selectivity necessary to adequately monitor one or more process parameters specific to membrane separation processes which are important to the evaluation of the performance of membrane separation.

SUMMARY OF THE INVENTION

The present invention provides methods and systems for monitoring and/or controlling membrane separation processes capable of treating feed streams suitable for use in industrial processes. In this regard, the detection of inert fluorescent tracers is utilized to evaluate and/or control a number of different process parameters unique to membrane separation, such as operational parameters, chemical parameters, mechanical parameters, and combinations thereof. The inert fluorescent tracer monitoring technique of the present invention can be performed with a high degree of sensitivity and selectivity with respect to the monitoring of process parameters specific to a membrane separation. In this regard, the methods and systems of the present invention can be effectively utilized to optimize the performance of membrane separation processes. Examples of such optimized performance include longer times between membrane cleanings, longer membrane life, verification of treatment chemical in the system, ability to operate at optimal recovery, and decreased energy costs due to better control of scaling, fouling and other system parameters.

To this end, in an embodiment of the present invention, a method of monitoring a membrane separation process including a membrane capable of separating a feed stream into at least a first stream and a second stream is provided. The method includes the steps of providing an inert fluorescent tracer; introducing the inert fluorescent tracer into the feed stream; providing a fluorometer to detect the fluorescent signal of the inert fluorescent tracer in at least one of the feed stream, the first stream and the second stream; and using the fluorometer to determine an amount of the inert fluorescent tracer in at least one of the feed stream, the first stream and the second stream.

In another embodiment, a method of monitoring a membrane separation system including a membrane capable of removing solutes from a feed stream suitable for use in an industrial process is provided. The method includes the steps of adding an inert tracer to the feed stream; contacting the membrane with the feed stream; separating the feed stream into a permeate stream and a concentrate stream to remove solutes from the feed stream; providing a fluorometer to detect the fluorescent signal of the inert tracer in at least one of the feed stream, the permeate stream and the concentrate stream; and using the fluorometer to measure an amount of the inert tracer in at least one of the feed stream, the permeate stream and the concentrate stream.

In yet another embodiment, a membrane separation system capable of purifying an aqueous feed stream suitable for use in an industrial process is provided. The membrane separation system includes a semi-permeable membrane capable of separating the aqueous feed stream containing an inert tracer into a permeate stream and a concentrate stream to remove one or more solutes from the aqueous feed stream; a detection device capable of fluorometrically measuring an amount of the inert tracer ranging from about 5 parts per trillion ("ppt") to about 1000 parts per million ("ppm") in at least one of the aqueous feed stream, the permeate stream and the concentrate stream wherein the detection device is capable of producing a signal indicative of the amount of inert tracer that is measured; and a controller capable of processing the signal to monitor and/or control the purification of the aqueous feed stream. Such monitoring or control may include control of chemical dosing and checking the accuracy/calibration of standard instruments (e.g. flow sensors).

In still another embodiment, a method of monitoring and controlling a membrane separation process including a membrane capable of removing solutes from a feed stream for use in an industrial process is provided. The method includes the steps of adding an inert tracer to the feed stream; contacting the membrane with the feed stream; separating the feed stream into a first effluent stream and a second effluent stream to remove solutes from the feed stream; providing a fluorometer to detect the fluorescent signal of the inert tracer in at least one of the feed stream, the first effluent stream and the second effluent stream; using the fluorometer to measure an amount of the inert tracer ranging from about 5 ppt to about 1000 ppm in at least one of the feed stream, the first effluent stream and the second effluent stream; and evaluating one or more process parameters specific to membrane separation based on the measurable amount of the inert tracer.

It is, therefore, an advantage of the present invention to provide methods and systems that utilize inert fluorescent tracers to monitor and/or control membrane separation processes or systems.

Another advantage of the present invention is to provide methods and systems that utilize measurable amounts of inert tracers to improve the operational efficiency of membrane separation processes or systems.

A further advantage of the present invention is to provide methods and systems for monitoring parameters specific to membrane separation processes with selectivity and specificity based on measurable amounts of inert tracers added to the membrane separation system.

Yet another advantage of the present invention is to provide methods and systems for monitoring and/or controlling membrane separation processes for purifying aqueous feed streams suitable for use in industrial water systems.

Still further an advantage of the present invention is to provide an improved performance specific to membrane separation processes or systems that utilize cross-flow and/or dead-end flow separation to remove solutes from feed streams.

Additional features and advantages of the present invention are described in, and will be apparent in, the detailed description of the presently preferred embodiments.

DETAILED DESCRIPTION OF THE PRESENTLY PREFERRED EMBODIMENTS

The present invention provides methods and systems for monitoring and/or controlling membrane separation processes that are capable of removing solutes from feed streams, such as aqueous feed streams, which are suitable for use in a number of different industrial applications. More specifically, the methods and systems of the present invention can monitor and/or control membrane separation processes based on measurable amounts of inert fluorescent tracers which have been added to the membrane separation process. In this regard, a number of different process parameters specific to membrane separation; including, for example, operational parameters, chemical parameters, mechanical parameters, like parameters and combinations thereof, can be evaluated with a high degree of selectivity, specificity and accuracy such that the performance of the membrane separation process can be effectively optimized.

The methods and systems of the present invention can include a variety of different and suitable components, process steps, operating conditions and the like, for monitoring and/or controlling membrane separation processes or systems. In an embodiment, the membrane separation process of the present invention includes cross flow and dead-end flow processes. During cross flow processes, the feed stream can be treated in a flow direction that is substantially parallel to the membrane of the separation system. With respect to dead-end flow separation processes, the feed stream can be treated in a flow direction that is substantially perpendicular to the membrane of the separation system.

In general, the membrane separation processes of the present invention are capable of treating or purifying feed streams by dividing the feed stream into separate streams. In an embodiment, the feed stream is separated into at least a first and second stream, such as a permeate stream and a concentrate stream. The feed stream can contain various solutes, such as dissolved organics, dissolved inorganics, dissolved solids, suspended solids, the like or combinations thereof. Upon separation of the feed stream into the permeate and the concentrate, in membrane filters for example, the permeate stream essentially contains a substantially lower concentration of dissolved and/or suspended solutes as compared to the aqueous feed stream. On the other hand, the concentrate stream has a higher concentration of dissolved and/or suspended solutes as compared to the aqueous stream. In this regard, the permeate represents a purified feed stream, such as a purified aqueous feed stream.

It should be appreciated that the present invention can be utilized with respect to a number of different types of membrane separation processes including, for example, cross flow processes, dead-end flow processes, reverse osmosis, ultrafiltration, microfiltration, nanofiltration, electrodialysis, electrodeionization, pervaporation, membrane extraction, membrane distillation, membrane stripping, membrane aeration and the like or combinations thereof. Reverse osmosis, ultrafiltration, microfiltration and nanofiltration are the preferred membrane separation processes.

In reverse osmosis, the feed stream is typically processed under cross flow conditions. In this regard, the feed stream flows substantially parallel to the membrane surface such that only a portion of the feed stream diffuses through the membrane as permeate. The cross flow rate is routinely high in order to provide a scouring action that lessens membrane surface fouling. This can also decrease concentration polarization effects (e.g., concentration of solutes in the reduced-turbulence boundary layer at the membrane surface, which can increase the osmotic pressure at the membrane and thus can reduce permeate flow). The concentration polarization effects can inhibit the feed stream water from passing through the membrane as permeate, thus decreasing the recovery ratio, e.g., the ratio of permeate to applied feed stream. A recycle loop(s) may be employed to maintain a high flow rate across the membrane surface.

Reverse osmosis processes can employ a variety of different types of membranes. Such commercial membrane element types include, without limitation, hollow fiber membrane elements, tubular membrane elements, spiral-wound membrane elements, plate and frame membrane elements, and the like, some of which are described in more detail in "The Nalco Water Handbook," Second Edition, Frank N. Kemmer ed., McGraw-Hill Book Company, New York, N.Y., 1988, incorporated hereinto, particularly Chapter 15 entitled "Membrane Separation". It should be appreciated that a single membrane element may be used in a given membrane filtration system, but a number of membrane elements can also be used depending on the industrial application.

A typical reverse osmosis system is described as an example of membrane filtration and more generally membrane separation. Reverse osmosis uses mainly spiral wound elements or modules, which are constructed by winding layers of semi-porous membranes with feed spacers and permeate water carriers around a central perforated permeate collection tube. Typically, the modules are sealed with tape and/or fiberglass over-wrap. The resulting construction has one channel which can receive an inlet flow. The inlet stream flows longitudinally along the membrane module and exits the other end as a concentrate stream. Within the module, water passes through the semi-porous membrane and is trapped in a permeate channel which flows to a central collection tube. From this tube it flows out of a designated channel and is collected.

In practice, membrane modules are stacked together, end to end, with inter-connectors joining the permeate tubes of the first module to the permeate tube of the second module, and so on. These membrane module stacks are housed in pressure vessels. Within the pressure vessel feed water passes into the first module in the stack, which removes a portion of the water as permeate water. The concentrate stream from the first membrane becomes the feed stream of the second membrane and so on down the stack. The permeate streams from all of the membranes in the stack are collected in the joined permeate tubes. Only the feed stream entering the first module, the combined permeate stream and the final concentrate stream from the last module in the stack are commonly monitored.

Within most reverse osmosis systems, pressure vessels are arranged in either "stages" or "passes." In a staged membrane system, the combined concentrate streams from a bank of pressure vessels are directed to a second bank of pressure vessels where they become the feed stream for the second stage. Commonly systems have 2 to 3 stages with successively fewer pressure vessels in each stage. For example, a system may contain 4 pressure vessels in a first stage, the concentrate streams of which feed 2 pressure vessels in a second stage, the concentrate streams of which in turn feed 1 pressure vessel in the third stage. This is designated as a "4:2:1" array. In a staged membrane configuration, the combined permeate streams from all pressure vessels in all stages are collected and used without further membrane treatment. Multi-stage systems are used when large volumes of purified water are required, for example for boiler feed water. The permeate streams from the membrane system may be further purified by ion exchange or other means.

In a multi-pass system, the permeate streams from each bank of pressure vessels are collected and used as the feed to the subsequent banks of pressure vessels. The concentrate streams from all pressure vessels are combined without further membrane treatment of each individual stream. Multi-pass systems are used when very high purity water is required, for example in the microelectronics or pharmaceutical industries.

It should be clear from the above examples that the concentrate stream of one stage of an RO system can be the feed stream of another stage. Likewise the permeate stream of a single pass of a multi-pass system may be the feed stream of a subsequent pass. A challenge in monitoring systems such as the reverse osmosis examples cited above is that there are a limited number of places where sampling and monitoring can occur, namely the feed, permeate and concentrate streams. In some, but not all, systems "inter-stage" sampling points allow sampling/monitoring of the first stage concentrate/second stage feed stream. Similar inter-pass sample points may be available on multi-pass systems as well.

In practice it is possible to "probe" the permeate collection tube within a single pressure vessel to sample the quality of the permeate from each of the membrane elements in the stack. It is a time consuming, messy and inexact method and is not routinely applied except in troubleshooting situations. There is no currently accepted method of examining the feed/concentrate stream quality of individual membrane elements within a single pressure vessel.

In contrast to cross-flow filtration membrane separation processes, conventional filtration of suspended solids can be conducted by passing a feed fluid through a filter media or membrane in a substantially perpendicular direction. This effectively creates one exit stream during the service cycle. Periodically, the filter is backwashed by passing a clean fluid in a direction opposite to the feed, generating a backwash effluent containing species that have been retained by the filter. Thus conventional filtration produces a feed stream, a purified stream and a backwash stream. This type of membrane separation is typically referred to as dead-end flow separation and is typically limited to the separation of suspended particles greater than about one micron in size.

Cross-flow filtration techniques, on the other hand, can be used for removing smaller particles (generally about one micron in size or less), colloids and dissolved solutes. Such types of cross-flow membrane separation systems can include, for example, reverse osmosis, microfiltration, ultrafiltration, nanofiltration, electrodialysis or the like. Reverse osmosis can remove even low molecular weight dissolved species that are at least about 0.0001 to about 0.001 microns in minimum diameter, including, for example, ionic and nonionic species, low molecular weight molecules, water-soluble macromolecules or polymers, suspended solids, colloids, and such substances as bacteria and viruses.

In this regard, reverse osmosis is often used commercially to treat water that has a moderate to high (e.g., 500 ppm or greater) total dissolved solids ("TDS") content. Typically on order of from about 2 percent to about 5 percent of the TDS of a feed stream will pass through the membrane. Thus, in general the permeate may not be entirely free of solutes. In this regard, the TDS of reverse osmosis permeates may be too high for some industrial applications, such as use as makeup water for high pressure boilers. Therefore, reverse osmosis systems and other like membrane separation systems are frequently used prior to and in combination with an ion exchange process or other suitable process to reduce the TDS loading on the resin and to decrease the amount of hazardous material used and stored for resin regeneration, such as acids and sodium hydroxide.

As discussed above, the performance of membrane separation systems can vary with respect to a number of different operational conditions specific to membrane separation, such as temperature, pH, pressure, permeate flow, activity of treatment and/or cleaning agents, fouling activity and the like. When developing and/or implementing a monitoring and/or control program based on the detection of inert fluorescent tracers, the effects of the operational conditions specific to membrane separation must necessarily be taken into consideration. As previously discussed, the operational conditions of water treatment processes can vary greatly from process to process. In this regard, the monitoring techniques as applied to each process can vary greatly.

Membrane separation processes and the monitoring thereof are unique because of the following considerations.

1. Systems are constructed with limited flexibility in terms of where monitoring may be done and/or where samples may be collected.
2. Membrane separation systems include a concentration polarization layer that forms as water is permeated through the barrier. This is not present in other water treatment systems, such as cooling water systems.
3. Membrane separation systems operate at significantly lower temperatures than industrial processes where inverse solubility of solutes is a problem. However, in the case of membrane separation systems such as reverse osmosis and nanofiltration, this low temperature leads to scaling from salts that are less likely to be problematic in higher temperature processes (such as silica and silicate salts). In this regard, typical day-to-day membrane separation operations (for example RO and NF) occur at about 75° F.
4. Because it is essential that the surface of the membrane remain clean, a relatively small amount of fine precipitate can cause a significant performance loss. The performance loss in a membrane is, thus, more sensitive to precipitate deposition as compared to cooling water treatment. In this regard, performance loss in a membrane can occur at a film thickness appreciably lower than that required for heat transfer loss to occur in a cooling water system.
5. Water loss in membrane filtration is due to "permeation" or passage through the membrane barrier. Damaged or otherwise imperfect membranes are susceptible to undesirable leakage of solutes through the membrane. Thus it is critical to monitor leakage through the membrane to keep it operating at maximum efficiency.
6. The thin, semi-permeable films (polymeric, organic or inorganic) are sensitive to degradation by chemical species. Products which contact the membranes surface must be compatible with the membrane chemistry to avoid damaging the surface and thereby degrading performance.
7. Chemical treatments used in membrane systems must be demonstrated to be compatible with the membrane material prior to use. Damage from incompatible chemicals can result in immediate loss of performance and perhaps degradation of the membrane surface. Such immediate, irreversible damages from a chemical treatment is highly uncommon in cooling water systems.

Based on these differences, a number of different factors and considerations must necessarily be taken into account when developing and/or implementing monitoring and/or controlling programs with respect to membrane separation systems as compared to other water treatment processes, such as cooling water treatment processes.

For example, both the cost of the membrane and the energy consumed can be significant operating cost factors specific to a membrane separation process. In this regard, deposits of scale and foulants on the membrane, on a small scale, can adversely impact the performance of membrane separation systems by, in membrane filtration for example, decreasing the permeate flow for a given driving force, lowering the permeate quality (purity), increasing energy consumed to maintain a given permeate flow, causing membrane replacement and/or unscheduled downtime for membrane replacement or cleaning/renovation, other like conditions and combinations thereof. In this regard, the continuous monitoring of process parameters specific to membrane filtration such as normalized permeate flow, driving force, differential pressure and percent rejection are generally believed to be critical to the detection of fouling and/or scaling and, thus, the implementation of remedial measures when such problems are observed. In reverse osmosis, about a ten to fifteen percent change in any of these parameters routinely signals a scaling/fouling problem requiring a responsive action, such as the adjustment of the dosage of treatment agent. Thus, detection of these problems at the earliest possible time can prevent, for example, undue energy consumption, loss of product, premature membrane replacement and the like. Ideally, when an unfavorable or questionable condition or change is detected in a system, some means, such as an alarm, will be used to notify an operator of the condition or change. Corrective action may then be taken as necessary or appropriate.

Applicants have uniquely discovered that the monitoring and/or controlling of process parameters specific to membrane separation based on measuring an amount of inert fluorescent tracer is faster, more sensitive, more comprehensive, more selective and/or more reliable than conventional techniques presently available, particularly when the monitoring methods of the present invention are employed on a substantially continuous basis. The present invention has enhanced diagnostic capabilities such that, for example, lack of chemical treatment, unplanned increases in percent recovery, increased passage of solutes, flow irregularities and scaling and/or fouling problems unique to membrane separation and/or membrane filtration can be detected with reasonable certainty, with far greater sensitivity, and under a far less elapsed time than the presently available methods. In this regard, temporary system upsets or other short-lived variations can be detected during continuous monitoring as the transient conditions that they are, rather than as incorrect warning signs as detected by sporadic monitorings.

As previously discussed, the methods and systems of the present invention employ inert fluorescent tracers to monitor and/or control the membrane separation processes. By utilizing inert tracers, the present invention can evaluate a number of different membrane separation process parameters with a greater selectivity and sensitivity as compared to conventional monitoring techniques. In this regard, the measurable amount of inert tracers can be effectively utilized to optimally maximize the performance of such systems.

The term "inert," as used herein refers to an inert fluorescent tracer that is not appreciably or significantly affected by any other chemistry in the system, or by the other system parameters such as pH, temperature, ionic strength, redox potential, microbiological activity or biocide concentration. To quantify what is meant by "not appreciably or significantly affected", this statement means that an inert fluorescent compound has no more than a 10% change in its fluorescent signal, under severe conditions encountered in industrial water systems. Severe conditions normally encountered in industrial water systems are known to people of ordinary skill in the art of industrial water systems.

It should be appreciated that a variety of different and suitable inert tracers can be utilized in any suitable amount, number and application. For example, a single tracer can be used to evaluate a number of different membrane separation process parameters. However, the present invention can include the use of a number of different tracers each functioning as tracers for separate monitoring applications. In an embodiment, inert fluorescent tracer monitoring of the present invention can be conducted on a singular, intermittent or semi-continuous basis, and preferably the concentration determination of the tracer in the stream is conducted on-site to provide a rapid real-time determination.

An inert tracer must be transportable with the water of the membrane separation system and thus substantially, if not wholly, water-soluble therein at the concentration it is used, under the temperature and pressure conditions specific and unique to the membrane separation system. In other words, an inert tracer displays properties similar to a solute of the membrane separation process in which it is used. In an embodiment, it is preferred that the inert tracer of the present invention meet the following criteria:

1. Not be adsorbed by the membrane in any appreciable amount;
2. Not degrade the membrane or otherwise hinder its performance or alter its composition;
3. Be detectable on a continuous or semi-continuous basis and susceptible to concentration measurements that are accurate, repeatable and capable of being performed on feedwater, concentrate water, permeate water or other suitable media or combinations thereof;
4. Be substantially foreign to the chemical species that are normally present in the water of the membrane separation systems in which the inert tracer(s) may be used;
5. Be substantially impervious to interference from, or biasing by, the chemical species that are normally present in the water of membrane separation systems in which the inert tracer(s) may be used;
6. Be substantially impervious to any of its own potential specific or selective losses from the water of membrane separation systems, including selective permeation of the membrane;
7. Be compatible with all treatment agents employed in the water of the membrane separation systems in which the inert tracer(s) may be used, and thus in no way reduce the efficacy thereof;
8. Be compatible with all components of its formulation; and
9. Be relatively nontoxic and environmentally safe, not only within the environs of the water or the membrane separation process in which it may be used, but also upon discharge therefrom.

It should be appreciated that the amount of inert tracer to be added to the membrane separation process that is effective without being grossly excessive can vary with respect to a variety of factors including, without limitation, the monitoring method selected, the extent of background interference associated with the selected monitoring method, the magnitude of the expected inert tracer(s) concentration in the feedwater and/or concentrate, the monitoring mode (such as, an on-line continuous monitoring mode), and other similar factors. In an embodiment, the dosage of an inert tracer added to the membrane separation system includes an amount that is at least sufficient to provide a measurable concentration in, for example, the concentrate stream, at steady state of at least about 5 ppt, and preferably at least about 1 ppb or about 5 ppb or higher, such as, up to about 100 ppm or about 200 ppm, or even as high as about 1000 ppm in the concentrate or other effluent stream. In an embodiment, the amount of tracer ranges from about 5 ppt to about 1000 ppm, preferably from about 1 ppb to about 50 ppm, more preferably from about 5 ppb to about 50 ppb.

In an embodiment, the inert tracer can be added to a membrane separation system as a component of a formulation, rather than as a separate component, such as a dry solid or neat liquid. The inert tracer formulation or product may include an aqueous solution or other substantially homogeneous mixture that disperses with reasonable rapidity in the membrane separation system to which it is added. In this regard, the inert tracer's concentration may be correlated to the concentration of a product. In an embodiment, the product or formulation can include a treatment agent which is added to treat scaling and/or fouling.

A variety of different and suitable types of compounds can be utilized as inert fluorescent tracers. In an embodiment, the inert fluorescent compounds can include, for example, the following compounds:

3,6-acridinediamine, N,N,N',N'-tetramethyl-, monohydrochloride, also known as Acridine Orange (CAS Registry No. 65-61-2), 2-anthracenesulfonic acid sodium salt (CAS Registry No. 16106-40-4), 1,5-anthracenedisulfonic acid (CAS Registry No. 61736-91-2) and salts thereof, 2,6-anthracenedisulfonic acid (CAS Registry No. 61736-95-6) and salts thereof, 1,8-anthracenedisulfonic acid (CAS Registry No. 61736-92-3) and salts thereof, anthra[9,1,2-cde]benzo[rst]pentaphene-5, 10-diol, 16,17-dimethoxy-, bis(hydrogen sulfate), disodium salt, also known as Anthrasol Green IBA (CAS Registry No. 2538-84-3, aka Solubilized Vat Dye), bathophenanthrolinedisulfonic acid disodium salt (CAS Registry No. 52746-49-3), amino 2,5-benzene disulfonic acid (CAS Registry No. 41184-20-7), 2-(4-aminophenyl)-6-methylbenzothiazole (CAS Registry No. 92-364), 1H-benz[de]isoquinoline-5-sulfonic acid, 6-amino-2,3-dihydro-2-(4-methylphenyl)1,3-dioxo-, monosodium salt, also known as Brilliant Acid Yellow 8G (CAS Registry No. 2391-30-2, aka Lissamine Yellow FF, Acid Yellow 7), phenoxazin-5-ium, 1-(aminocarbonyl)-7-(diethylamino)-3, 4-dihydroxy-, chloride, also known as Celestine Blue (CAS Registry No. 1562-90-9), benzo[a]phenoxazin-7-ium, 5,9-diamino-, acetate, also known as cresyl violet acetate (CAS Registry No. 10510-54-0), 4-dibenzofuransulfonic acid (CAS Registry No. 42137-76-8), 3-dibenzofuransulfonic acid (CAS Registry No. 215189-98-3), 1-ethylquinaldinium iodide (CAS Registry No. 606-53-3), fluorescein (CAS Registry No. 2321-07-5), fluorescein, sodium salt (CAS Registry No. 518-47-8, aka Acid Yellow 73, Uranine), Keyfluor White ST (CAS Registry No. 144470-48-4, aka Flu. Bright 28), benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Keyfluor White CN (CAS Registry No. 16470-24-9), C.I. Fluorescent Brightener 230, also known as Leucophor BSB (CAS Registry No. 68444-86-0),
benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Leucophor BMB (CAS Registry No. 16470-249, aka Leucophor U, Flu. Bright. 290),
9,9'-biacridinium, 10,10'-dimethyl-, dinitrate, also known as Lucigenin (CAS Registry No. 2315-97-1, aka bis-N-methylacridinium nitrate),
1-deoxy-1-(3,4-dihydro-7,8-dimethyl-2,4-dioxobenzo[g] pteridin-10(2H)-yl)-D-ribitol, also known as Riboflavin or Vitamin B2 (CAS Registry No. 83-88-5),
mono-, di-, or tri-sulfonated napthalenes, including but not limited to
  1,5-naphthalenedisulfonic acid, disodium salt (hydrate) (CAS Registry No. 1655-29-4, aka 1,5-NDSA hydrate),
  2-amino-1-naphthalenesulfonic acid (CAS Registry No. 81-16-3),
  5-amino-2-naphthalenesulfonic acid (CAS Registry No. 119-79-9),
  4-amino-3-hydroxy-1-naphthalenesulfonic acid (CAS Registry No. 90-51-7),
  6-amino-4-hydroxy-2-naphthalenesulfonic acid (CAS Registry No. 116-63-2),
  7-amino-1,3-naphthalenesulfonic acid, potassium salt (CAS Registry No. 79873-35-1),
  4-amino-5-hydroxy-2,7-naphthalenedisulfonic acid (CAS Registry No. 90-20-0),
  5-dimethylamino-1-naphthalenesulfonic acid (CAS Registry No. 4272-77-9),
  1-amino-4-naphthalene sulfonic acid (CAS Registry No. 84-86-6),
  1-amino-7-naphthalene sulfonic acid (CAS Registry No. 119-28-8), and
  2,6-naphthalenedicarboxylic acid, dipotassium salt (CAS Registry No. 2666-06-0),
3,4,9,10-perylenetetracarboxylic acid (CAS Registry No. 81-32-3),
C.I. Fluorescent Brightener 191, also known as Phorwite CL (CAS Registry No. 12270-53-0),
C.I. Fluorescent Brightener 200, also known as Phorwite BKL (CAS Registry No. 61968-72-7),
benzenesulfonic acid, 2,2'-(1,2-ethenediyl)bis[5-(4-phenyl-2H-1,2,3-triazol-2-yl)-, dipotassium salt, also known as Phorwite BHC 766 (CAS Registry No. 52237-03-3),
benzenesulfonic acid, 5-(2H-naphtho[1,2-d]triazol-2-yl)-2-(2-phenylethenyl)-, sodium salt, also known as Pylaklor White S—ISA (CAS Registry No. 6416-68-8),
1,3,6,8-pyrenetetrasulfonic acid, tetrasodium salt (CAS Registry No. 59572-10-0),
pyranine, (CAS Registry No. 6358-69-6, aka 8-hydroxy-1, 3, 6-pyrenetrisulfonic acid, trisodium salt),
quinoline (CAS Registry No. 91-22-5),
3H-phenoxazin-3-one, 7-hydroxy-, 10-oxide, also known as Rhodalux (CAS Registry No. 550-82-3),
xanthylium, 9-(2,4-dicarboxyphenyl)-3,6-bis (diethylamino)-, chloride, disodium salt, also known as Rhodamine WT (CAS Registry No. 37299-86-8),
phenazinium, 3,7-diamino-2,8-dimethyl-5-phenyl-, chloride, also known as Safranine 0 (CAS Registry No. 477-73-6),
C.I. Fluorescent Brightener 235, also known as Sandoz CW (CAS Registry No. 56509-06-9),
benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Sandoz CD (CAS Registry No. 16470-24-9, aka Flu. Bright. 220),
benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, also known as Sandoz TH-40 (CAS Registry No. 32694-95-4),
xanthylium, 3,6-bis(diethylamino)-9-(2,4-disulfophenyl)-, inner salt, sodium salt, also known as Sulforhodamine B (CAS Registry No. 3520-42-1, aka Acid Red 52),
benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, also known as Tinopal 5BM-GX (CAS Registry No. 169762-28-1),
Tinopol DCS (CAS Registry No. 205265-33-4),
benzenesulfonic acid, 2,2'-([1,1'-biphenyl]-4,4'-diyldi-2,1-ethenediyl)bis-, disodium salt also known as Tinopal CBS-X (CAS Registry No. 27344-41-8),
benzenesulfonic acid, 5-(2H-naphtho[1,2-d]triazol-2-yl)-2-(2-phenylethenyl)-, sodium salt, also known as Tinopal RBS 200, (CAS Registry No. 6416-68-8),
7-benzothiazolesulfonic acid, 2,2'-(1-triazene-1,3-diyldi-4, 1-phenylene)bis[6-methyl-, disodium salt, also known as Titan Yellow (CAS Registry No. 1829-00-1, aka Thiazole Yellow G), and
all ammonium, potassium and sodium salts thereof, and all like agents and suitable mixtures thereof.

Preferred tracers include:
1-deoxy-1-(3,4-dihydro-7,8-dimethyl-2,4-dioxobenzo[g] pteridin-10(2H)-yl)-D-ribitol, also known as Riboflavin or Vitamin B2 (CAS Registry No. 83-88-5),
fluorescein (CAS Registry No. 2321-07-5),
fluorescein, sodium salt (CAS Registry No. 518-47-8, aka Acid Yellow 73, Uranine),
2-anthracenesulfonic acid sodium salt (CAS Registry No. 16106-40-4),
1,5-anthracenedisulfonic acid (CAS Registry No. 61736-91-2) and salts thereof,
2,6-anthracenedisulfonic acid (CAS Registry No. 61736-95-6) and salts thereof,
1,8-anthracenedisulfonic acid (CAS Registry No. 61736-92-3) and salts thereof,
mono-, di-, or tri-sulfonated napthalenes, including but not limited to
  1,5-naphthalenedisulfonic acid, disodium salt (hydrate) (CAS Registry No. 1655-29-4, aka 1,5-NDSA hydrate),
  2-amino-1-naphthalenesulfonic acid (CAS Registry No. 81-16-3),
  5-amino-2-naphthalenesulfonic acid (CAS Registry No. 119-79-9),
  4-amino-3-hydroxy-1-naphthalenesulfonic acid (CAS Registry No. 90-51-7),
  6-amino-4-hydroxy-2-naphthalenesulfonic acid (CAS Registry No. 116-63-2),
  7-amino-1,3-naphthalenesulfonic acid, potassium salt (CAS Registry No. 79873-35-1),
  4-amino-5-hydroxy-2,7-naphthalenedisulfonic acid (CAS Registry No. 90-20-0),
  5-dimethylamino-1-naphthalenesulfonic acid (CAS Registry No. 4272-77-9),
  1-amino-4-naphthalene sulfonic acid (CAS Registry No. 84-86-6),
  1-amino-7-naphthalene sulfonic acid (CAS Registry No. 119-28-8), and
  2,6-naphthalenedicarboxylic acid, dipotassium salt (CAS Registry No. 2666-06-0), 3,4,9,10-perylenetetracarboxylic acid (CAS Registry No. 81-32-3), C.I. Fluorescent Brightener 191, also known as, Phorwite CL (CAS Registry No. 12270-53-0), C.I. Fluorescent Brightener 200, also known as Phorwite BKL (CAS Registry No. 61968-72-7), benzenesulfonic acid, 2,2'-(1,2-ethenediyl)bis[5-(4-phenyl-2H-1,2,3-triazol-2-yl)-, dipotassium salt, also known as Phorwite BHC 766 (CAS Registry No. 52237-03-3), benzenesulfonic acid, 5-(2H-naphtho[1,2-d]triazol-2-yl)-2-(2-phenylethenyl)-, sodium salt, also known as Pylaklor White S-15A (CAS Registry No. 6416-68-8), 1,3,6,8-pyrenetetrasulfonic acid, tetrasodium salt (CAS Registry No. 59572-10-0), pyranine, (CAS Registry No. 6358-69-6, aka 8-hydroxy-1, 3, 6-pyrenetrisulfonic acid, trisodium salt), quinoline (CAS Registry No. 91-22-5), 3H-phenoxazin-3-one, 7-hydroxy-, 10-oxide, also known as Rhodalux (CAS Registry No. 550-82-3), xanthylium, 9-(2,4-dicarboxyphenyl)-3,6-bis (diethylamino), chloride, disodium salt, also known as Rhodamine WT (CAS Registry No. 37299-86-8), phenazinium, 3,7-diamino-2,8-dimethyl-5-phenyl-, chloride, also known as Safranine 0 (CAS Registry No. 477-73-6), C.I. Fluorescent Brightener 235, also known as Sandoz CW (CAS Registry No. 56509-06-9), benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Sandoz CD (CAS Registry No. 16470-24-9, aka Flu. Bright. 220), benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, also known as Sandoz TH-40 (CAS Registry No. 32694-95-4), xanthylium, 3,6-bis(diethylamino)-9-(2,4-disulfophenyl)-, inner salt, sodium salt, also known as Sulforhodamine B (CAS Registry No. 3520-42-1, aka Acid Red 52), benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino)-, disodium salt, also known as Tinopal 5BM-GX (CAS Registry No. 169762-28-1), Tinopol DCS (CAS Registry No. 205265-33-4), benzenesulfonic acid, 2,2'-([1,1'-biphenyl]-4,4'-diyldi-2,1-ethenediyl)bis-, disodium salt, also known as Tinopal CBS-X (CAS Registry No. 27344-41-8), benzenesulfonic acid, 5-(2H-naphtho[1,2-d]triazol-2-yl)-2-(2-phenylethenyl)-, sodium salt, also known as Tinopal RBS 200, (CAS Registry No. 6416-68-8), 7-benzothiazolesulfonic acid, 2,2'-(1-triazene-1,3-diyldi-4,1-phenylene)bis[6-methyl-, disodium salt, also known as Titan Yellow (CAS Registry No. 1829-00-1, aka Thiazole Yellow G), and all ammonium, potassium and sodium salts thereof, and all like agents and suitable mixtures thereof.

The most preferred fluorescent inert tracers of the present invention include 1,3,6,8-pyrenetetrasulfonic acid tetrasodium salt (CAS Registry No. 59572-10-0); 1,5-naphthalenedisulfonic acid disodium salt (hydrate) (CAS Registry No. 1655-29-4, aka 1,5-NDSA hydrate); xanthylium, 9-(2,4-dicarboxyphenyl)-3,6-bis (diethylamino), chloride, disodium salt, also known as Rhodamine WT (CAS Registry No. 37299-86-8); 1-deoxy-1-(3,4-dihydro-7,8-dimethyl-2,4-dioxobenzo[g]pteridin-10(2H)-yl)-D-ribitol, also known as Riboflavin or Vitamin B2 (CAS Registry No. 83-88-5); fluorescein (CAS Registry No. 2321-07-5); fluorescein, sodium salt (CAS Registry No. 518-47-8, aka Acid Yellow 73, Uranine); 2-anthracenesulfonic acid sodium salt (CAS Registry No. 16106-40-4); 1,5-anthracenedisulfonic acid (CAS Registry No. 61736-91-2) and salts thereof; 2,6-anthracenedisulfonic acid (CAS Registry No. 61736-95-6) and salts thereof; 1,8-anthracenedisulfonic acid (CAS Registry No. 61736-92-3) and salts thereof; and mixtures thereof. The fluorescent tracers listed above are commercially available from a variety of different chemical supply companies.

In addition to the tracers listed above, those skilled in the art will recognize that salts using alternate counter ions may also be used. Thus, for example, anionic tracers which have $Na^+$ as a counter ion could also be used in forms where the counter ion is chosen from the list of: $K^+$, $Li^+$, $NH_4^+$, $Ca^{+2}$, $Mg^{+2}$ or other appropriate counter ions. In the same way, cationic tracers may have a variety of counter ions, for example: $Cl^-$, $SO_4^{-2}$, $PO_4^{-3}$, $HPO_4^{-2}$; $H_2PO_4^-$; $CO_3^{-2}$; $HCO_3^-$; or other appropriate counter ions.

Modifications of these tracers to control molecular weight or physical size within a desirable size range by, for example, affixing them to an inert polymeric molecule, incorporating them into a fluorescent microsphere or adding additional chemical moieties in the side chains of the molecules should be obvious to those skilled in the art. Such modifications are included herein.

As previously discussed, the inert tracer(s) is measured or detected to evaluate the performance of the membrane separation process. A determination of the presence of an inert fluorescent tracer and the concentration thereof in the influent/feedwater and/or other process stream of a membrane separation process can be made when the concentration of the inert tracer in the influent/feedwater and/or other stream of a membrane separation system is several parts per million or less, even as low as parts per billion as previously discussed.

At times, it may be desired to employ a number of inert tracers. In this regard, it may be desired to use a number of inert tracers to monitor, for example, inert tracer-specific losses, variances, like conditions or combinations thereof. Such separate and distinct inert tracers can each be detected and quantified in a single influent/feedwater and/or other stream fraction despite both being inert fluorescent tracers provided that their respective wavelengths of emission do not interfere with one another. Thus, concurrent analyses for multiple inert tracers is possible by selection of inert tracers that have appropriate spectral characteristics.

The inert tracers of the present invention can be detected by utilizing a variety of different and suitable techniques. For example, fluorescence emission spectroscopy on a substantially continuous basis, at least over a given time period, is one of the preferred analytical techniques according to an embodiment of the present invention. One method for the continuous on-stream measuring of chemical tracers by fluorescence emission spectroscopy and other analysis methods is described in U.S. Pat. No. 4,992,380, B. E. Moriarty, J. J. Hickey, W. H. Hoy, J. E. Hoots and D. A. Johnson, issued Feb. 12, 1991, incorporated hereinto by reference.

In general, for most fluorescence emission spectroscopy methods having a reasonable degree of practicality, it is preferable to perform the analysis without isolating in any manner the tracer(s). Thus, there may be some degree of background fluorescence in the influent/feedwater and/or concentrate on which the fluorescence analysis is conducted. This background fluorescence may come from chemical compounds in the membrane separation system (including the influent/feedwater system thereof) that are unrelated to the membrane separation process of the present invention.

In instances where the background fluorescence is low, the relative measurable intensities (measured against a standard fluorescent compound at a standard concentration and assigned a relative intensity, for instance 100) of the fluorescence of the inert tracer versus the background can be very high, for instance a ratio of 100/10 or 500/10, when certain combinations of excitation and emission wavelengths are employed even at low fluorescent compound concentrations. Such ratios would be representative of a "relative fluorescence" (under like conditions) of respectively 10 and 50. In an embodiment, the excitation/emission wavelengths and/or the amount of inert tracer employed are selected to provide a relative fluorescence of at least about 5 or about 10 for the given background fluorescence anticipated.

Examples of fluorometers that may be used in the practice of this invention include the TRASAR® 3000 and TRASAR® 8000 fluorometers (available from Ondeo Nalco Company of Naperville, Ill.); the Hitachi F-4500 fluorometer (available from Hitachi through Hitachi Instruments Inc. of San Jose, Calif.); the JOBIN YVON FluoroMax-3 "SPEX" fluorometer (available from JOBIN YVON Inc. of Edison, N.J.); and the Gilford Fluoro-IV spectrophotometer or the SFM 25 (available from Bio-tech Kontron through Research Instruments International of San Diego, Calif.). It should be appreciated that the fluorometer list is not comprehensive and is intended only to show examples of fluorometers. Other commercially available fluorometers and modifications thereof can also be used in this invention.

It should be appreciated that a variety of other suitable analytical techniques may be utilized to measure the amount of inert tracers during the membrane separation process. Examples of such techniques include combined HPLC-fluorescence analysis, colorimetry analysis, ion selective electrode analysis, transition metal analysis and the like.

For example, the combination of high-pressure liquid chromatography ("HPLC") and fluorescence analyses of inert fluorescent tracers can be utilized to detect measurable amounts of the inert tracer within the membrane separation system of the present invention, particularly when very low levels of the inert tracer are used or the background fluorescence encountered would otherwise interfere with the efficacy of fluorescence analysis. The HPLC-fluorescence analysis method allows the inert tracer compound to be separated from the fluid matrix and then the inert tracer concentration can be measured.

The HPLC method can also be effectively employed to separate an inert tracer compound from a fluid matrix for the purposes of then employing an inert tracer-detection method other than the fluorescence analysis. An example of this type of chromatographic technique is described in "Techniques in Liquid Chromatography", C. F. Simpson ed., John Wiley & Sons, New York, pp. 121–122, 1982, incorporated herein by reference, and "Standard Method for the Examination of Water and Wastewater", 17th Edition, American Public Health Association, pp. 6–9 to 6–10, 1989, incorporated herein by reference.

With respect to colorimetry analysis, colorimetry and/or spectrophotometry may be employed to detect and/or quantify an inert chemical tracer. Colorimetry is a determination of a chemical specie from its ability to absorb ultraviolet or visible light. Calorimetric analysis techniques and the equipment that may be employed therefor are described in U.S. Pat. No. 4,992,380, B. E. Moriarty, J. J. Hickey, W. H. Hoy, J. E. Hoots and D. A. Johnson, issued Feb. 12, 1991, incorporated herein by reference.

With respect to ion selective electrode analysis, an ion selective electrode may be used to determine the concentration of an inert chemical tracer through the direct potentiometric measurement of specific ionic tracers in aqueous systems. An example of an ion selective electrode tracer monitoring technique is described in U.S. Pat. No. 4,992,380, B. E. Moriarty, J. J. Hickey, W. H. Hoy, J. E. Hoots and D. A. Johnson, issued Feb. 12, 1991, incorporated herein by reference.

It should be appreciated that analytical techniques for detecting and/or quantifying the presence and/or concentration of a chemical specie without isolation thereof are within an evolving technology. In this regard, the above survey of analytical techniques suitable for use in detecting measurable amounts of the inert tracer during the membrane separation process of the present invention may presently not be exhaustive. Thus, analytical techniques equivalent to the above for purposes of the present invention may likely be developed in the future.

As previously discussed, the present invention can provide highly selective and/or sensitive monitoring of a variety of process parameters unique and specific to the membrane separation process. The monitoring is based on the measurable amounts of an inert tracer analyzed during the membrane separation process. In this regard, the inert tracer can be detected at any suitable location or locations within the membrane separation process, such as any suitable position in a membrane filtration process along the feedwater stream, the concentrate stream, the permeate stream, the like or combinations thereof. This effectively corresponds to a concentration of the inert tracer in each stream.

In an embodiment, the monitoring of the membrane filtration process of the present invention can be based on a measurable amount of the inert tracer from at least one of the feedwater stream, the permeate stream and the concentrate stream. For example, when the parameter of interest is the percent rejection (discussed below), it is believed that the most sensitive determinations are of the feedwater inert tracer concentration and the permeate inert tracer concentration (which will be zero if the percent rejection is 100 percent). The percent rejection parameter, that is, the percent of solute that has been rejected or has not passed through the membrane, can be determined by the following relationships:

$$C_R = C_B/C_F = F/B \quad \text{Equation 1}$$

$$F = P[C_R/(C_R-1)] \quad \text{Equation 2}$$

$$C_R = [1/(1-R)] \quad \text{Equation 3}$$

where $C_F$ is the concentration of solute in the feed stream (e.g., combined fresh feed fluid and recycled feed fluid); $C_P$ is the concentration of solute in the permeate as discharged through; $C_B$ is the concentration of solute in the concentrate water as discharged through; F is the feed stream flow rate in gal/min; P is the permeate discharge flow rate in gal/min; B is the concentrate water flow rate; L is the recycle rate; R is the recovery ratio (e.g., P/F); and $C_R$ is the concentration ratio, (e.g., $C_B/C_F$).

When there is less than complete rejection of a solute, for instance only 80 percent rejection (e.g., a 0.8 rejection factor), $C_R$ will be less than F/B as shown in Equation 4:

$$C_R = (F/B) \times \text{rejection factor} \quad \text{Equation 4}$$

The rejection factor again is the measure of the extent of solute rejection by the membrane, as calculated in Equation 5, wherein $C_F$ is the concentration of solute in the feedwater and $C_P$ is the concentration of solute in the permeate:

$$\text{rejection factor} = (C_F - C_P)/C_F \quad \text{Equation 5}$$

The same equations will apply in a traced stream (e.g., a stream that contains an inert tracer(s)) wherein "tracer-C" (e.g., tracer-$C_F$, tracer-$C_P$ and tracer-$C_B$) is substituted for $C_F$, $C_P$ and $C_B$ in equations 1–5. When there is less than complete rejection of an inert tracer, for instance only 80 percent rejection (a 0.8 rejection factor), tracer-$C_R$ will be less than F/B as shown in Equation 4. In this regard, the determination of the rejection of the inert tracer in the membrane filtration system is at least proportional to the rejection of the solute within same. In a preferred embodiment, the percent rejection is determined and maintained at an amount ranging from about 95 to about 100 percent.

In this regard, monitoring of an amount of the inert tracer as it may vary during membrane filtration can be utilized to evaluate a number of process parameters specific to membrane filtration such as a percent recovery, percent rejection, recovery ratio or the like, with a high degree of sensitivity, selectivity and accuracy, as previously discussed. The ability to evaluate these types of membrane separation process parameters with such level of certainty, sensitivity and selectivity and on a continual basis in accordance with the present invention can provide a better understanding, in real time, of the performance of the membrane. Thus, adjustments to the membrane separation process can be made more responsively and effectively based on the measured amount of the inert tracer, if needed, to optimize membrane performance. For example, adjustments can be made to increase the recovery ratio or percent recovery of the membrane separation system. In this regard, increasing the recovery ratio or percent recovery, for unit product, will reduce the feedwater required and thus reduce feedwater costs, lower influent fluid pretreatment costs and chemical treatment requirements. It should be appreciated that the optimal percent rejection value can vary with respect to the type of membrane separation system. In addition, percent recovery may be calculated in various ways. In membrane filtration the percent recovery calculation can be based on ratios of the various streams or on concentrations of solutes within those streams. In this regard, the amount of inert tracer in the various streams can provide an accurate assessment of percent recovery as well as a method for checking the calibration of the mechanical flow sensors in the system.

However, unless controlled or optimally minimized, scaling and/or fouling of the membrane can adversely impact the performance of membrane separation. If deposition on the membrane is neither prevented nor detected soon enough for effective removal by cleaning methods, the normal life of the membrane, which can be about three to five years for reverse osmosis, may be severely shortened and replacement costs dramatically increased. As previously discussed, the membrane separation systems are more sensitive to such scaling and/or fouling activity as compared to cooling water systems. It should be appreciated that the membrane separation system of the present invention can include any suitable type and amount of components in order to effectively treat the scale and/or fouling conditions, such as, any suitable treatment or pretreatment system including antiscalants and/or biofouling agents, filters, treatment equipment, such as chemical agent delivery devices, suitable like components or combinations thereof.

For example, suitable antiscalants that can be used in the membrane separation system (especially reverse osmosis systems) of the present invention include suitable polymers in aqueous solution which inhibit the formation and growth of alkaline earth carbonate and sulfate scales, including calcium carbonate ("$CaCO_3$"), calcium sulfate ("$CaSO_4$") or the like. Antiscalant chemicals are generally fed continuously into the feed stream wherein the optimum feed point is before a cartridge prefilter positioned along the feedwater stream. The use of a continuous feed of antiscalants can minimize or eliminate the need for acid to be fed into the system in order to control scale, and can facilitate the suspension of solids and colloids in solution. This can minimize membrane fouling, and inhibit the precipitation of $CaCO_3$ and $CaSO_4$.

In an embodiment, the present invention can monitor and/or control the concentration of the scaling and/or fouling treatment agents within the membrane separation process based on the measurable amounts of the inert fluorescent tracer in the system. In an embodiment, the inert tracer is continuously fed to the feedwater along with the treatment agents. It should be appreciated that the inert tracer can be added separately or as a part of a formulation of the treatment agent to the feedwater. In an embodiment, the inert tracer is fed to the feedwater in known proportion to the scaling and/or biofouling agent. In this regard, the measure of the inert tracer concentration corresponds to (is proportional to) the chemical concentration (under zero-system-consumption conditions) at any suitable tracer monitoring point within the membrane separation system.

The chemicals or treatment agents employed as antiscalants and/or anti-fouling agents, and the mechanisms by which they inhibit scale deposition, may change as improvements are made in antiscalant chemistry for membrane filtration systems, but the need for a continuous feed of treatment agents will most likely continue despite the improvements.

As previously discussed, inert tracers of the present invention can be utilized to monitor a variety of different parameters specific to membrane separation such that the performance of membrane separation processes can be effectively monitored and controlled. In an embodiment, the parameters can include normalized permeate flow and percent rejection (as discussed above). In this regard, the present invention can be utilized to assess and/or control a variety of different process conditions that can impact membrane performance, for example, scaling and/or fouling conditions, membrane leakage, degradation and the like specific to the membrane separation process as previously discussed.

It should be appreciated that the preferred inert tracers of the present invention, substantially have a rejection factor of 1, and more preferably are employed in minute concentrations. Thus, the use of the inert tracer of the present invention does not in any significant manner add to the total dissolved solids ("TDS") of the permeate nor detrimentally effect a downstream ion exchange process or other permeate polishing process.

Normalized Permeate Flow Monitoring

The normalized permeate flow is typically considered a sensitive forecaster of trouble in a membrane filtration process, such as reverse osmosis. In this regard, a reduction of the permeate flow rate is a strong indicator of membrane fouling, whereas its increase is a strong indicator of membrane degradation, for instance due to an adverse operation condition. In reverse osmosis the actual permeate flow rate can vary with respect to the feed stream temperature, driving force and feedstream TDS. Normalized permeate flow is determined through a simple calculation which eliminates the effect of actual system temperature and driving force variations and converts the actual permeate flow readings to what they would be if the system were operating at constant ("normal") driving force and temperature conditions, which are routinely the start-up driving force and 25° C. The actual permeate flow rate is conventionally a direct reading from a permeate flowmeter. The temperature conversion factor for a given feedwater temperature is provided by the membrane manufacturer for each specific membrane.

Normalized Permeate Flow Example

In reverse osmosis systems employing differential pressure as the driving force, the feed pressure and permeate pressure variations are reduced to a differential pressure conversion factor which includes the start-up net pressure divided by the actual net differential pressure (e.g., a differential pressure calculated by subtracting the permeate pressure from the feed pressure, which in turn can be measured from any suitable pressure meters). The permeate flow rate is multiplied by the temperature conversion factor and the driving pressure conversion factor. Applicants have discovered that the monitoring of the inert tracer of the present invention can be used to enhance normalized flow monitoring.

The monitoring of inert tracer concentrations in the feedwater and the concentrate can provide a measure of actual permeate flow, which will be the difference between total flow (e.g., the feedwater flow which an inert tracer measures) and concentrate flow (which an inert tracer also measures). The inert tracer monitorings of the present invention, thus, can provide a measure of actual permeate flow in addition to the readings from the usual flow meter. With a combination of normalized permeate flow determinations and driving force measures, several critical trends can be readily detected. If the normalized permeate flow is dropping while the driving force is increasing, this signals membrane fouling. If, instead, the normalized permeate flow is dropping while the driving force remains the same there is a forewarning to check the gauges and the like for accuracy.

As previously discussed, there exists a relationship between the flow rate and the concentration of the inert tracer such that the water flow can be determined based on the measurable amount of the inert tracer in the membrane separation system. The flow rate of any membrane separation process stream is the volume that passes a given point within a given time period. The monitoring of the concentration of an inert tracer in a stream at a given point, thus, can provide a determination of flow rate by mass balance of inert tracer ions in solution compared to inert tracer added. Alternatively, since the mass flow rates of the discharge streams, in combination, must equal the mass flow rate of the feed stream, and the mass of the inert tracer in the discharge streams, in combination, must equal the mass of the inert tracer in the feedstream, flow rates and/or inert tracer concentrations of one of such streams can be calculated from the others, when known. Moreover, when an inert tracer is added to the feedwater at a known rate (e.g., amount per unit time), the concentration of an inert tracer in the feedwater as it passes the feedwater tracer monitoring point itself can determine the flow rate of the feed stream.

Differential Pressure Monitoring

In membrane filtration, the differential pressure is the difference between the feed pressure and the concentrate pressure. It is a measure of the hydraulic pressure losses through the membrane-filtration membrane elements and the manifold piping. When the feed stream flow channels become clogged, the driving force increases. The differential pressure also depends upon the feedstream flow rate and the percent recovery. An accurate comparison between differential pressure readings taken at different times requires that the membrane filtration system is operating at the same percent recovery and feed flow rate in each instance. In this regard, inert tracer monitoring can be utilized to accurately assess the differential pressure of the membrane separation system. It should be appreciated that the differential pressure at any given point in time can be determined by conventional methods.

Percent Rejection Monitoring

The percent rejection is the percentage of solute(s) that is rejected by the membrane separation process. In practice, a percent rejection is based on one or more selected solutes rather than the entirety of solutes in the feedwater, and the percent rejection value can include an accompanying identification of the reference solute(s). The percent rejection often will change upon the onset of a membrane and/or system problem, such as fouling, scaling, membrane hydrolysis, improper pH, too low of a feed pressure, too high of a recovery rate, a change in the composition of the influent fluid source, a leaking "0" ring and the like.

Typically, a decrease in percent rejection can indicate problems associated with membrane performance. However, the percent rejection may increase upon membrane clogging by certain foulants. In membrane filtration the percent rejection is the rejection factor (e.g., Equation 5) expressed as a percentage (e.g., multiplied by 100). The present process permits the percent rejection to be determined almost instantaneously, using Equation 6 as follows:

$$\text{rejection factor} = (\text{tracer-}C_F - \text{tracer-}C_P)/\text{tracer-}C_F \qquad \text{Equation 6}$$

where the virtually instantaneous and continuous monitorings of the feedwater inert tracer concentration and the permeate inert tracer concentration can be determined with a high degree of selectivity, sensitivity and accuracy as previously discussed. Since the feedwater inert tracer concentration (tracer-CF) effectively varies little in contrast to other feedwater solutes (whose concentrations vary with feedwater quality fluctuations), and since the inert tracer can be detected more accurately at low levels than most all other solutes, less natural data variation (e.g., variations arising from feedwater concentration variations) can exist with the method of the present invention as compared to conventional percent recovery monitoring techniques that typically measure the concentration of solutes to determine percent recovery. This reduction in natural data variation makes subtle trends easier to identify.

It should be appreciated that the present invention can be utilized to assess and/or control a variety of different conditions that may have an impact on the performance of the membrane separation process. For example, the present invention can be utilized to monitor leaks in the membrane elements. This is very important to the practical operation of a membrane separation system.

In this regard, leakage of concentrate through a membrane itself or a component of the membrane element contaminates the permeate. Permeate contamination by virtue of leakage may at times be so severe that the performance of the membrane separation process is substantially impaired, and at best the quality of the permeate is diminished. Upon such leakage there will be an increase in the normalized permeate flow and permeate solute concentrations, but the increases may be minor and most probably not be detected for at least a number of hours if conventional monitoring techniques are utilized.

Applicants have discovered that the present invention can monitor membrane leakage with a high degree of sensitivity, selectivity and/or accuracy and that can be readily conducted on a continuous basis. For instance, if under normal conditions a reverse osmosis system is producing a 75/25 ratio of parts by weight of permeate to parts by weight of concentrate (e.g., the permeate having 40 ppm TDS and the concentrate having 2000 ppm. TDS) a leakage of 1 percent of the concentrate (e.g., 0.75 parts) into the permeate would increase the weight of the permeate by only 3 percent. Such increase would be difficult to detect solely by conventional methods of monitoring the normalized permeate flow. If undetected, such a leak would then double the permeate TDS to about 97 ppm. When the inert fluorescent tracer monitoring of the present invention is utilized to monitor the permeate, particularly on a continuous or substantially continuous basis, an increase in permeate inert tracer concentration can be readily detected to signal that leakage is likely to be occurring. In addition, the detection of an increase in the concentration of permeate inert tracer would follow the onset of the leakage almost instantaneously.

When a reverse osmosis system employs a number of membrane elements, the produced permeate from each are often combined before permeate quality screening. An increase in permeate TDS from a single membrane element is less detectable by a determination of TDS with respect to the combined permeates because of the dilution effects. In addition, the TDS increase in the combined permeates does not indicate the site of the leakage. When the present process is employed to monitor permeate inert tracer concentration, the separate permeates produced by each membrane element can easily be monitored before the permeates are combined. Not only can the present process detect the leakage, but it can also be utilized to determine the location of the leak.

In addition to the monitoring capabilities of the present invention discussed above, a number of different other process conditions of membrane separation systems can also be monitored by the present invention on a regular or continuous basis to provide a real-time assessment of membrane performance. These conditions can include, for example, concentrate flow rate, percent recovery and biocide concentration. In this regard, the SDI measures the quantity of particulate contamination in waters by particles about 0.45 micron in diameter or greater. In an embodiment, the concentrate flow rate and percent recovery can be monitored with a single inert tracer as discussed above. In an embodiment, the biocide concentration can be most effectively monitored using a separate inert tracer.

The methods of the present invention can include any suitable type, number and combination of components, such as inert tracer compounds, inert tracer detection devices (e.g., analytical techniques) or the like. In an embodiment, the chemical compound(s) selected as the inert tracer(s) is soluble in the membrane separation stream to which it is added to the concentration value desired and is substantially stable in the environment thereof for the useful life expected of the inert tracer(s). In a preferred embodiment, the combination of the chemical compound(s) selected as the inert tracer(s) and the analytical technique selected for determining the presence of such inert tracer(s), permits such determination without isolation of the inert tracer(s), and more preferably should permit such determination on a continuous and/or on-line basis.

In an embodiment, the present invention includes a controller (not shown) to monitor and/or control the operating conditions and the performance of the membrane separation process based on the measurable amount of inert fluorescent tracer(s). The controller can be configured and/or adjusted in a variety of different and suitable ways.

For example, the controller can be in contact with the detection device (not shown) to process the detection signal (e.g., filter noise from the signal) in order to enhance the detection of the inert tracer. Further, the controller can be adjusted to communicate with other components of the membrane separation system. The communication can be either hard wired (e.g., electrical communication cable), a wireless communication (e.g., wireless RF interface), a pneumatic interface or the like.

In this regard, the controller can be utilized to control the performance of membrane separation. For example, the controller can communicate with a feed device (not shown) in order to control the dosage of treatment agents, such as antiscalants and biocides, within the membrane separation process. In an embodiment, the controller is capable of adjusting the feed rate of the feed stream based on the amount of inert tracer that is measured.

It should be appreciated that pairs or groups of inert tracer monitoring points that are to be compared should not be positioned across a flow-through site that has a high concentration of solids, for instance a solids concentration of at least about 5 or about 10 weight percent per unit volume based on a measured volume unit of about one cubic inch. Such high solids concentration flow-through sites are found at the site of filter cakes and the like. In this regard, these sites may absorb, or selectively absorb, at least some amount of the inert tracer. This can distort the significance of monitoring comparison. When an inert tracer is added upstream of, for instance, a cartridge filter, in an embodiment, the first monitoring location of a monitoring pair should preferably be downstream of such sites.

However, separate monitorings across a flow-through site of high solids concentration may be conducted to determine the loss of an inert tracer from the fluid, and if such loss is nonselective for the inert tracer, the loss of other solutes at that site. For instance, when the flow-through site is a cartridge filter, such monitorings can determine the loss of solutes, if any, attributable to that pretreatment location. Other high solids concentration sites include without limitation sites of solids concentration(s) created by the use of chemical additives such as coagulants, flocculants and the like.

In an embodiment, the inert tracer selected is not a visible dye, that is, the inert tracer is a chemical specie that does not have a strong absorption of electromagnetic radiation in the visible region, which extends from about 4000 Angstroms to about 7000 Angstroms (from about 400 nanometers ("nm") to about 700 nm). Preferably the tracer is chosen from a class of materials which are excited by absorption of light and product fluorescent light emission, where the excitation and emission light occurs at any point within the far ultraviolet to near infrared spectral regions (wavelengths from 200–800 nm). The relative fluorescence intensity of the inert tracer must be such that it is detectable in the amounts specified by product formulations (typically 2–10 ppb as active fluorophore when dosed into the feed water stream of a device).

Alternatively, when the tracer dye does have strong adsorbtions in the visible spectrum, it is used in concentrations such that it is not detectable to the naked eye. Such embodiments may be preferred, for instance, when a membrane's percent rejection of the tracer is less than 100 percent, and it is desirable to produce a permeate free of color.

In some instances, it may be preferable to chose a fluorophore which emits visible fluorescent light when excited by UV light. This may be preferred when visual detection and/or photographic or other imaging of the system is desired.

Although membrane separation systems are often employed for the purification of water, or the processing of aqueous streams, the systems of the present invention are not limited to the use of an aqueous influent. In an embodiment, the influent may be another fluid, or a combination of water and another fluid. The operational principles of membrane separation systems and processes of the present invention are not so governed by the nature of the influent that the present invention could not be employed with influents otherwise suitable for water purification in a given membrane separation system. The descriptions of the invention above that refer to aqueous systems are applicable also to nonaqueous and mixed aqueous/nonaqueous systems.

In an embodiment, the inert fluorescent tracer monitoring methods of the present invention can be utilized to monitor membranes which are subjected to destructive (sacrificial) testing. This type of testing may include the sectioning or division of an industrial membrane, for instance by cutting, into a number of separate membrane pieces prior to testing so that a number of tests can be performed, each on a different section of the membrane. In this regard, the inert fluorescent tracer monitoring of the present invention can be utilized to monitor a number of different parameters of destructive testing including, without limitation, the effects of excessive pressure, contact with a membrane-destructive fluid and the like. The diagnostic regime of the destructive testing would generally be focused on the membrane which may be subjected to visual inspection of its surface, a membrane-surface microbiological analysis by swabbing of its surface and analysis of water samples in contact with membrane, surface analysis for inorganic deposits by SEM/EDS, surface analysis for organic deposits by JR, electron microscopy, ICP and like surface analysis techniques.

Although the membrane during destructive testing is not on-line, in an embodiment of the present invention the inert tracer can be added to a fluid stream which flows to the membrane and passes by or through it as a first effluent stream to exit as a second effluent stream. The inert tracer can be added to the fluid upstream of the membrane and the inert tracer in the fluid stream at least passes by the membrane as a component of the first effluent stream and/or passes through the membrane to exit as a component of the second effluent stream. The inert tracer is monitored in the fluid stream at a point before the membrane to determine an influent inert concentration value, and/or in at least one of the first and the second effluent streams to determine an effluent inert tracer concentration. In this regard, the inert tracer is representative of a solute of the fluid stream that can be added to the fluid in an amount sufficient for the determinations of influent inert tracer concentration and effluent inert concentration. Thus, the separation performance of the membrane can be determined prior to actual use.

"Deposits" is meant herein to refer to material that forms and/or collects on surfaces of a membrane. The "amount" or "concentration" of inert tracer is meant herein to refer to the concentration of the inert tracer in the specified fluid in terms of weight of the inert tracer per unit volume of the fluid, or weight of the inert tracer per unit weight of the fluid, or some characteristic of the inert tracer that is proportional to its concentration in the fluid and can be correlated to a numerical value of the inert tracer concentration in the fluid (whether or not that correlation conversion is calculated), and can be a value of zero or substantially zero. Thus, the process of the present invention includes the detection of the absence of such chemical species, at least to the limitations of the analytical method employed.

The foregoing descriptions of the present invention at times refer specifically to aqueous influents and effluents, and the use of an aqueous system for describing a membrane filtration system and the operation of the present invention therein is exemplitive. A person of ordinary skill in the art, given the disclosures of the present specification, would be aware of how to apply the foregoing descriptions to non-aqueous membrane filtration systems.

"Treatment chemicals and/or agents" is meant herein without limitation to include treatment chemicals that enhance membrane separation process performance, antiscalants that retard/prevent membrane scale deposition, antifoulants that retard/prevent membrane fouling, biodispersants, microbial-growth inhibiting agents, such as biocides and cleaning chemicals that remove membrane deposits.

It should be appreciated that the present invention is applicable to all industries that can employ membrane separation processes. For example, the different types of industrial processes in which the method of the present invention can be applied generally include raw water processes, waste water processes, industrial water processes, municipal water treatment, food and beverage processes, pharmaceutical processes, electronic manufacturing, utility operations, pulp and paper processes, mining and mineral processes, transportation-related processes, textile processes, plating and metal working processes, laundry and cleaning processes, leather and tanning processes, and paint processes.

In particular, food and beverage processes can include, for example, dairy processes relating to the production of cream, low-fat milk, cheese, specialty milk products, protein isolates, lactose manufacture, whey, casein, fat separation, and brine recovery from salting cheese. Uses relating to the beverage industry including, for example, fruit juice clarification, concentration or deacidification, alcoholic beverage clarification, alcohol removal for low-alcohol content beverages, process water; and uses relating to sugar refining, vegetable protein processing, vegetable oil production/processing, wet milling of grain, animal processing (e.g., red meat, eggs, gelatin, fish and poultry), reclamation of wash waters, food processing waste and the like.

Examples of industrial water uses as applied to the present invention include, for example, boiler water production, process water purification and recycle/reuse, softening of raw water, treatment of cooling water blow-down, reclamation of water from papermaking processes, desalination of sea and brackish water for industrial and municipal use, drinking/raw/surface water purification including, for example, the use of membranes to exclude harmful microorganisms from drinking water, polishing of softened water, membrane bio-reactors, mining and mineral process waters.

Examples of waste water treatment applications with respect to the inert tracer monitoring methods of the present invention include, for example, industrial waste water treatment, biological waste treatment systems, removal of heavy metal contaminants, polishing of tertiary effluent water, oily waste waters, transportation related processes (e.g., tank car wash water), textile waste (e.g., dye, adhesives, size, oils for wool scouring, fabric finishing oils), plating and metal working waste, laundries, printing, leather and tanning, pulp and paper (e.g., color removal, concentration of dilute spent sulfite liquor, lignon recovery, recovery of paper coatings), chemicals (e.g., emulsions, latex, pigments, paints, chemical reaction by-products), and municipal waste water treatment (e.g., sewage, industrial waste).

Other examples of industrial applications of the present invention include, for example, semiconductor rinse water processes, production of water for injection, pharmaceutical water including water used in enzyme production/recovery and product formulation, and electro-coat paint processing.

Examples of diagnostics which can be determined by the use of inert tracers include, but are not limited to, effective "residence times" for species within the membrane, system flow profiles, membrane damage detection, system recovery based on mass balance, detection of scaling or fouling tendency (based on differences between mass balance and flow based system parameters), system volume calculation, chemical treatment product distribution and feed variability.

EXAMPLES

The following examples are intended to be illustrative of the present invention and to teach one of ordinary skill how to make and use the invention. These examples are not intended to limit the invention or its protection in any way.

Example 1

Tests were performed using a multi-stage reverse osmosis system. The system utilized six pressure vessels, arranged in a 2:2:1:1 configuration with each pressure vessel containing 3 spiral wound membrane elements. The membrane elements were a polyamide based elements from several element manufacturers. Typical system recovery, based on system flows, was 75–80%, with the feed flow ranging from about 100 to about 130 gpm.

The feed water included an inert fluorescent tracer (an aqueous solution of 1,3,6,8-pyrenetetrasulfonic acid tetrasodium salt (PTSA)), diluted with water to give a final concentration of 0.20 to 0.25% as the active fluorophore in an aqueous solution. The inert tracer was fed into the RO membrane system using a positive displacement pump at a feed rate of approximately 2 milliliters/minute and at a concentration of about 6 ppm into the feed stream described above.

The concentration of the inert tracer was fluorometrically measured (with a TRASAR® 3000 and/or a TRASAR® 8000 fluorometer) in the RO membrane system in both the feed stream and the concentrate stream over a select period of time, generally one to three hours with data being collected at one second intervals. (Fluorometer readings were expressed as "ppm of treatment product." The fluorometer was programmed to read the concentration of the tracer and convert the reading into ppm of treatment. In this case, the treatment was assumed to contain 0.2% active fluorophore.) Periodic fluctuations in the concentration of the inert tracer in both of the concentrate and feed streams were continuously detected. For example, the concentration of the inert tracer in the concentrate stream varied from about 40 ppb of tracer (20 ppm as treatment product) to as high as about 180 ppb of tracer (90 ppm as treatment product). In general, the concentration of the inert tracer in the concentrate stream varied between about 40 ppb of tracer (20 ppm as treatment product) and about 80 ppb of tracer (40 ppm as treatment product). In comparison, the concentration of the inert tracer in the feed stream varied from about 10 ppb of tracer (5 ppm as treatment product) or less to as high as about 130 ppb of tracer (65 ppm as treatment product). In general, the concentration of the inert tracer in the feed stream varied from about 10 ppb of tracer (5 ppm as treatment product) or lower to about 20 ppb of tracer (10 ppm as treatment product).

The ability of the present invention to detect fluctuations in the concentration of the inert tracer added to the membrane separation system uniquely allows the present invention to evaluate process parameters specific to a membrane separation with a high degree of selectivity, sensitivity and/or accuracy such that the performance (e.g., operational, chemical, mechanical and/or the like) of membrane separation can be effectively monitored. In this regard, suitable adjustments can be controllably and responsively made to the membrane separation system such that performance is optimized. For example, the detection of fluctuations in the concentration of the inert fluorescent tracer during membrane separation (as discussed above) may necessarily indicate that suitable and responsive adjustments to the membrane separation process are necessary to decrease the fluctuations, and, thus enhance membrane separation performance.

The test results also displayed spikes in the concentration of the inert tracer in both of the feed stream and the concentrate stream. As previously discussed, the spike in the amount of inert tracer in the feed stream occurred at about 120 ppb of tracer (60 ppm as treatment product) in comparison to that in the concentrate stream which occurred at about 180 ppb of tracer (90 ppm as treatment product). By measuring the elapsed time between the spikes in both of the feed and concentrate streams, the effective residence time of solutes within the membrane separation system can be calculated. This information can be useful, for example, in developing a treatment strategy specific to membrane separation.

Furthermore, the tracer was used to calculate percent recovery as described above. Whereas the percent recovery calculations based on flow measurements indicate recoveries of about 35% to about 80%, recovery calculations based on mass balance of the tracer shows significantly higher percent recovery values (89–92%). Such information is useful in developing effective scale control strategies.

Example 2

Experiments were performed using thin film composites of a polyamide based reverse osmosis membrane material in order to simulate process conditions utilizing a reverse osmosis membrane separation system.

In this regard, a number of flat or planar sheets of the membrane were cut from a roll of the polyamide material which is a commercially available product, for example FT30 from FILMTEC of Minneapolis, Minn.

Tests were performed in a SEPA CF, flat plate reverse osmosis cell which is commercially available from the Osmonics Corporation of Minnetonka, Minn. In general, the test system included a feed water tank, a high pressure pump, and the flat plate cell. The system was modified so that the change in pressure across the membrane and the inlet pressure, as well as the feedwater, permeate water, and concentrate water conductivities, and the permeate and concentrate water flows could be continuously monitored. A data logger, available from the Yokogawa Corporation of America of Newnan, Ga., was used to continuously monitor and collect data. Fluorometers (TRASAR® 3000, TRASAR® 8000 and Hitachi F4500) were used to measure the concentrations of tracers in the systems.

The experimental test conditions were as follows:

| | |
|---|---|
| $NaHCO_3$ | 118 ppm |
| $CaCl_2$ | 694 ppm |
| $MgSO_4 \cdot 7H_2O$ | 1281 ppm |
| $Na_2HPO_4$ | 2.82 ppm |
| pH | 8.5 |

Permeate was sent to drain and concentrate returned to the feed water tank. The test was designed to form scale on the membrane over time, thus decreasing permeate flow.

Tests were run to show monitoring of the reverse osmosis system with an undamaged membrane. As shown by the calculated performance parameters in Table 2 below, the percent rejection of the tracer was 100%. This indicates that the tracer molecule did not pass through an undamaged membrane. In contrast, a portion of the dissolved salts (as measured by conductivity) did pass through the membrane.

TABLE 1

| Measured Parameters | | | | | | | | | | | | | |
|---|---|---|---|---|---|---|---|---|---|---|---|---|---|
| Tracer concentrations (ppm) | | | Conductivity (mS) | | | Temperature (Degrees) | | Flow (ml/min) | | | Pressure (psi) | | |
| feed | reject | permeate | feed | reject | permeate | F. | C. | reject | permeate | feed | feed | reject | permeate |
| 0.586 | 0.647 | 0.000 | 4.13 | 4.83 | 0.278 | 64 | 18 | 101 | 16.4 | 117 | 380 | 379 | 0 |
| 0.504 | 0.570 | 0.000 | 4.00 | 4.66 | 0.203 | 70 | 21 | 100 | 19 | 119 | 380 | 379 | 0 |
| 0.429 | 0.465 | 0.000 | 5.49 | 6.15 | 0.151 | 66 | 19 | 100 | 11.8 | 112 | 380 | 379 | 0 |

TABLE 2

Calculated Parameters

| Percent Rejection Based on Various Measures | | Percent Recovery Based on Various Measures | | System Normalized | Avg. |
|---|---|---|---|---|---|
| Inert Florescent Tracer | Conductivity | NPF | Tracer | Conductivity | Flow (NPF) | Pressure Drop |

| Inert Florescent Tracer | Conductivity | NPF | Tracer | Conductivity | Flow (NPF) | Pressure Drop |
|---|---|---|---|---|---|---|
| 100.0 | 93.3 | 14.0 | 9.4 | 15.4 | 20 | 1 |
| 100.0 | 94.9 | 16.0 | 11.6 | 14.8 | 21 | 1 |
| 100.0 | 97.2 | 10.6 | 7.7 | 11.0 | 14 | 1 |

Another sheet of polyamide membrane material was damaged by swabbing the surface with a 0.05% hypochlorite solution. Using a feed solution of 1500, ppm NaCl, rejection of the tracer molecule was monitored. All other experimental conditions were the same as above. The results shown below in Table 4 indicate significant passage of the tracer through the damaged membrane. Since conductive salts pass through both undamaged (Table 2) and damaged (Table 3) membranes, the tracer only passes through damaged membranes, making tracer measurement a more sensitive indicator of membrane damage than conductivity measurements.

TABLE 3

Measured Parameters

| Tracer concentrations (ppm) | | | Conductivity (mS) | | | Temperature (Degrees) | | Flow (ml/min) | | | Pressure (psi) | | |
|---|---|---|---|---|---|---|---|---|---|---|---|---|---|
| feed | reject | permeate | feed | reject | permeate | F. | C. | reject | permeate | feed | feed | reject | permeate |
| 0.604 | 0.633 | 0.000 | 5.02 | 5.25 | 0.182 | 77 | 25 | 242 | 13.9 | 256 | 380 | 379 | 0 |
| 0.605 | 0.655 | 0.140 | 5.02 | 5.36 | 1.470 | 73 | 23 | 177 | 16.5 | 194 | 380 | 379 | 0 |
| 0.605 | 0.655 | 0.081 | 5.02 | 5.36 | 0.970 | 73 | 23 | 176 | 15.7 | 192 | 380 | 379 | 0 |

TABLE 4

Calculated Parameters

| Percent Rejection Based on Various Measures | | Percent Recovery Based on Various Measures | | System Normalized | Avg. |
|---|---|---|---|---|---|
| Inert Florescent Tracer | Conductivity | NPF | Tracer | Conductivity | Flow (NPF) | Pressure Drop |

| Inert Florescent Tracer | Conductivity | NPF | Tracer | Conductivity | Flow (NPF) | Pressure Drop |
|---|---|---|---|---|---|---|
| 100.0 | 96.4 | 5.4 | 4.6 | 4.5 | 14 | 1 |
| 76.9 | 70.7 | 8.5 | 9.7 | 8.7 | 18 | 1 |
| 86.6 | 80.7 | 8.2 | 8.7 | 7.7 | 17 | 1 |

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of monitoring a reverse osmosis membrane separation process including a reverse osmosis membrane capable of separating a feed stream into at least a first stream and a second stream wherein said monitoring substantially consists of:

providing at least one inert fluorescent tracer;
introducing the inert fluorescent tracer into the feed stream
providing at least one fluorometer to detect the fluorescent signal of the inert fluorescent tracer in at least one of the feed stream, the first stream and the second stream; and
using the at least one fluorometer to determine an amount of the inert fluorescent tracer in at least one of the feed stream, the first stream and the second stream, wherein the reverse osmosis membrane separation process is selected from the group consisting of a cross-flow reverse osmosis membrane separation process and a dead-end flow reverse osmosis membrane separation process.

2. A method of monitoring a reverse osmosis membrane separation process including a reverse osmosis membrane capable of separating a feed stream into at least a first stream and a second steam wherein said monitoring substantially consists of:

providing at least one inert fluorescent tracer;
introducing the inert fluorescent tracer into the feed streams
providing at least one fluorometer to detect the fluorescent signal of the inert fluorescent tracer in at least one of the feed stream, the first stream and the second stream, and
using the at least one fluorometer to determine an amount of the inert fluorescent tracer in at least one of the feed stream, the first stream and the second stream, wherein the inert fluorescent tracer is selected from the group consisting of 3,6-acridinediamine, N,N,N',N'-tetramethyl-,monohydrochloride; 2-anthracenesulfonic acid sodium salt; 1,5-anthracenedisulfonic acid; 2,6-anthracenedisulfonic acid; 1,8-anthracenedisulfonic acid; anthra[9,1,2-cdc]benzo[rst]pentaphene-5,10-diol, 16,17-dimethoxy-,bis(hydrogen sulfate), disodium salt; bathophenanthrolinedisulfonic acid disodium salt, amino 2,5-benzene disulfonic acid; 24-aminophenyl)-6-methylbenzothiazole; 1H-benz[de]isoquinoline-5-sulfonic acid, 6-amino-2,3-dihydro-2-(4-methylphenyl)-1,3-dioxo-, monosodium salt; phenoxazin-5-ium, 1-(aminocarbonyl)-7-(diethylamino)3,4-dihydroxy-, chloride; benzo[a]phenoxazin-7-ium, 5,9-diamino-,acetate; 4-dibenzofuransulfonic acid; 3-dibenzofuransulfonic acid; 1-ethylquinaldinium iodide; fluorescein; fluorescein, sodium salt; Keyfluor White ST; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-,tetrasodium salt; C.I. Florescent Brightener 230; benzenesulfonic acid, 2,2'-(1,2-ethenediyl)bis[5-[[4-[bis(2-hydroxyethyl)amino]-[(4-sulfophenyl)amino]-1,3,5-triazin-2-yl]amino)-, tetasodium salt; 9,9'-biacridinium, 10,10'-dimethyl-, dinitrate; 1-deoxy-1-(3,4-dihydro-7,8-dimethyl-2,4- dioxobenzo[g]pteridin-10(2H)-yl)-ribitol; mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenesulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10 perylenetetracarboxylic acid; C.I. Fluorescent Brightener 191; C.I. Fluorescent Brightener 200; benzenesulfonic acid, 2,2'-(1,2-ethenediyl)bis[5-(4-phenyl-2H-1,2,3-triazol-2-yl)-, dipotassium salt; benzenesulfonic acid, 5-(2H-naphtho[1,2-d]triazol-2-yl)-2 (2-phenylethenyl)-, sodium salt; 1,3,6,8-pyrenetetrasulfonic acid, tetrasodium salt; pyranine; quinoline; 3H-phenoxazin-3-one, 7-hydroxy-, 10-oxide; xanthylium, 9-(2,4-dicarboxyphenyl)-3,6-bis(diethylamino), chloride, disodium salt; phenazinium, 3,7-diamino-2,8-dimethyl-5-phenyl-, chloride; C.I. Fluorescent Brightener 235; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt; benzenesulfonic acid, 2,2'-(1,2-ethenediyl)bis[5-[[4-[(2-hydroxypropyl)amino]&(phenylamino)-1,3,5-triazin-2-yl]amino]-, disodium salt; xanthylium, 3,6-bis(diethylamino)-9(2,4-disulfophenyl), inner salt, sodium salt; benzenesulfonic acid, 2,2'-(1,2-ethenediyl)bis[5-[[4[(aminomethyl)(2-hydroxyethyl)amino]-6-(phenylamino)-1,3,5-triazin-2-yl]amino]-, disodium salt; TinopoI DCS; benzenesulfonic acid, 2,2'-([1,1'-biphenyl]-4,4'-diyldi-2,1-ethenediyl)bis, disodium salt; benzenesulfonic acid, 5-(2H-naphtho[1,2d]triazol-2-yl)2-(2-phenylethenyl), sodium salt; 7 benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof.

3. A method of monitoring a reverse osmosis membrane separation process including a reverse osmosis membrane capable of separating a feed stream into at least a first stream and a second stream wherein said monitoring substantially consists of:

providing at least one inert fluorescent tracer, introducing the inert fluorescent tracer into the feed stream;

providing at least one fluorometer to detect the fluorescent signal of the inert fluorescent tracer in at least one of the feed stream, the first stream and the second stream; and using the at least one fluorometer to determine an amount of the inert fluorescent tracer in at least one of the feed stream the first stream and the second stream, wherein the inert fluorescent tracer is selected from the group consisting of 1-deoxy-1-(3,4-dihydro-7,8-dimethyl-2,4-dioxobenzo[g]pteridin-10(2H)-yl)-D ribitol; fluorescein; fluorescein, sodium salt; 2-anthracenesulfonic acid sodium salt; 1,5-anthracenedisulfonic acid; 2,6-anthracenedisulfonic acid; anthracenedisulfonic acid: mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenesulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,& naphthalenedicarboxylic acid, dipotassium salt; 3,4,9,10-perylenetetracarboxylic acid; C.I. Fluorescent Brightener 191; C.I. Fluorescent Brightener 200; benzenesulfonic acid, 2,2'-(1,2-ethenediyl)bis[5-(4-phenyl-2H-1,2,3-triazol-2-yl), dipotassium salt; benzenesulfonic acid, 5-(2H-naphtho[1,2-d]triazol-2-yl)$_{22}$-phenylethenyl)-, sodium salt; 1,3,6,8-pyrenetetrasulfonic acid, tetrasodium salt; pyranine; quinoline; 3H-phenoxazin-3-one, 7-hydroxy-, 10-oxide; xanthylium, 9-(2,4-dicarboxyphenyl)3,6-bis(diethylamino), chloride, disodium salt; phenazinium, 3,7-diamino-2,8-dimethyl-5-phenyl-, chloride; C.I. Fluorescent Brightener 235; benzenesulfonic acid, 2,2'-(1,2-ethenediyl)bis[5-[[4-[bis(2-hydroxyethyl)amino]-6-[(4-sulfophenyl)amino]1,3,5-triazin-2-yl]amino]-, tetrasodium salt; benzenesulfonic acid, 2,2'-(1,2-ethenediyl)bis[5-[[4-[4-[2-hydroxypropyl)amino]-6-(phenylamino)-1,3,5-triazin-2-yl]amino]-, disodium salt; xanthylium, 3,6-bis(diethylamino)-9-(2-4-disulfophenyl)-, inner salt, sodium salt; benzenesulfonic acid, 2,2'-(1,2-ethenediyl)bis[5-[(4 [(aminomethyl)(2-hydroxyethyl)amino]-6-(phenylamino)-1,3,5-triazin-2-yl]amino]-,disodium salt; Tinopol DCS; benzenesulfonic acid, 2,2'-([1,1'-biphenyl]-4,4'-diyldi-2,1-ethenediyl)bis-,disodium salt; benzenesulfonic acid, 5-(2H-naphtho[1,2-d]triazol-2-yl)-2-(2-phenylethenyl)-, sodium salt; 7-benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof.

4. A method of monitoring a reverse osmosis membrane separation process including a reverse osmosis membrane capable of separating a feed stream into at least a first stream and a second stream wherein said monitoring substantially consists of:

providing at least one inert fluorescent tracer;

introducing the inert fluorescent tracer into the feed stream;

providing at least one fluorometer to detect the fluorescent signal of the inert fluorescent tracer in at least one of the feed stream, the fist stream and the second stream; and using the at least one fluorometer to determine an amount of the inert fluorescent tracer in at least one of the feed stream, the first stream and the second stream, wherein the inert fluorescent tracer is selected from the group consisting of 1,3,6,8-pyrenetetrasulfonic acid tetrasodium salt; 1,5-naphthalenedisulfonic acid disodium salt (hydrate); xanthylium, 9-(2,4-dicarboxyphenyl)-3,6-bis(diethylamino, chloride, disodium salt; 1-deoxy-1-(3,4-dihydro-7,8-dimethyl-2,4-dioxobenzo[g]pteridin-10(2H)-yl)-D-ribitol; fluorescein; flurorescein, sodium salt; 2-anthracenesulfonic acid sodium salt; 1,5-anthracenedisulfonic acid; 2,6-anthracenedisulfonic acid; 1,8-anthracenedisulfonic acid; and mixtures thereof.

5. A method of monitoring a reverse osmosis membrane separation process including a reverse osmosis membrane capable of separating a feed stream into at least a first stream and a second stream wherein said monitoring substantially consists of:

providing at least one inert fluorescent tracer;
introducing the inert fluorescent tracer into the feed stream;
providing at least one fluorometer to detect the fluorescent signal of the inert fluorescent tracer in at least one of the feed stream, the first stream and the second stream; and
using the at least one fluorometer to determine an amount of the inert fluorescent tracer in at least one of the feed stream, the first stream and the second stream, wherein the inert fluorescent tracer is introduced into the feed stream in an amount from about 5 ppt to about 1000 ppm.

6. The method of claim 1 further comprising the step of evaluating a process parameter other than leakage of the reverse osmosis membrane separation process based on the amount of the inert fluorescent tracer that is measured.

7. The method of claim 6, wherein an inert tracer is added to a formulation which is subsequently added to the feed stream.

8. A method of monitoring a reverse osmosis membrane separation process including a reverse osmosis membrane capable of separating a feed stream into at least a fist stream and a second stream wherein said monitoring substantially consists of:
providing at least one inert fluorescent tracer;
introducing the inert fluorescent tracer into the feed stream;
providing at least one fluorometer to detect the fluorescent signal of the inert fluorescent tracer in at least one of the feed stream, the first stream and the second stream; and
using the at least one fluorometer to determine an amount of the inert fluorescent tracer in at least one of the feed stream the first stream and the second stream wherein the inert fluorescent tracer is introduced into the feed stream in an amount from about 1 ppb to about 50 ppm.

9. A method of monitoring a reverse osmosis membrane separation process including a reverse osmosis membrane capable of separating a feed stream into at least a first stream and a second stream wherein said monitoring substantially consists of:
providing at least one inert fluorescent tracer;
introducing the inert fluorescent tracer into the feed stream;
providing at least one fluorometer to detect the fluorescent signal of the inert fluorescent tracer in at least one of the feed stream, the first stream and the second stream; and
using the at least one fluorometer to determine an amount of the inert fluorescent tracer in at least one of the feed stream, the first stream and the second stream, wherein the inert fluorescent tracer is introduced into the feed stream in an amount from about 5 ppb to about 50 ppb.

10. A method of monitoring a reverse osmosis membrane separation process including a reverse osmosis membrane capable of separating a feed stream into at least a first stream and a second stream wherein said monitoring substantially consists of:
providing at least one inert fluorescent tracer:
introducing the inert fluorescent tracer into the feed stream;
providing at least one fluorometer to detect the fluorescent signal of the inert fluorescent tracer in at least one of the feed stream, the first stream and the second stream; and
using the at least one fluorometer to determine an amount of the inert fluorescent tracer in at least one of the feed stream the first stream and the second stream wherein the amount of an inert fluorescent tracer is correlated to an amount of the formulation added to the feed stream.

11. The method of claim 10, wherein an inert tracer is added to the formulation which is subsequently added to the feed stream.

12. A method of monitoring a reverse osmosis membrane separation system including a reverse osmosis membrane capable of removing solutes from a feed stream suitable for use in an industrial process wherein said monitoring substantially consists of:
adding at least one inert tracer to the feed stream;
contacting the reverse osmosis membrane with the feed stream;
separating the feed stream into a permeate stream and a concentrate stream to remove solutes from the feed stream;
providing at least one fluorometer to detect the fluorescent signal of the inert tracer in at least one of the feed stream, the permeate stream and the concentrate stream; and
using the at least one fluorometer to measure an amount of the inert tracer in at least one of the feed stream, the permeate stream and the concentrate stream,
evaluating the removal of solutes from the feed stream based on the amount of the inert tracer that is measured.

13. The method of claim 12 wherein the industrial process is selected from the group consisting of raw water processes, waste water processes, industrial water processes, municipal water treatment, food and beverage processes, pharmaceutical processes, electronic manufacturing, utility operations, pulp and paper processes, mining and mineral processes, transportation-related processes, textile processes, plating and metal working processes, laundry and cleaning processes, leather and tanning processes, and paint processes.

14. The method of claim 12 wherein the feed stream contacts the reverse osmosis membrane in a cross flow relative to the reverse osmosis membrane.

15. The method of claim 12 wherein the feed stream contacts the reverse osmosis membrane in a flow direction substantially perpendicular to the reverse osmosis membrane.

16. The method of claim 12 wherein the inert fluorescent tracer is selected from the group consisting of 3,6-acridinediamine, N,N,N',N'-tetramethyl-, monohydrochloride; 2-anthracenesulfonic acid sodium salt; 1,5-anthracenedisulfonic acid, 2,6-anthracenedisulfonic acid; 1,8-anthracenedisulfonic acid, anthra[9,1,2-cde]benzo[rst]pentaphene-5,10-diol, 16,17-dimethoxy-,bis(hydrogen sulfate), disodium salt; bathophenanthrolinedisulfonic acid disodium salt; amino 2,5-benzene disulfonic acid; 2-(4-aminophenyl)-6-methylbenzothiazole; 1H-benz[de]isoquinoline-5-sulfonic acid, 6-amino-2,3-dihydro-2-(4-methylphenyl)-3-dioxo-, monosodium salt; phenoxazin-5-ium, 1-(aminocarbonyl)-$_7$-(diethylamino)3,4-dihydroxy-, chloride; benzo[a]phenoxazin-7-ium, 5,9-diamino-,acetate; 4-dibenzofuransulfonic acid; 3-dibenzofuransulfonic acid; 1-ethylquinaldinium iodide; fluorescein; fluorescein, sodium salt; Keyfluor White ST; benzenesulfonic acid, 2,2'-(1,2-ethenediyl)bis[5-[[4-[bis(2-hydroxyethyl)amino][(4-sulfophenyl)amino]-1,3,5-triazin-2-yl]amino]-,tetrasodium salt; C.I. Florescent Brightener 230; benzenesulfonic acid, 2,2'-(1,2-ethenediyl)bis[5-[[4-[bis(2-hydroxyethyl)amino]-6[(4-sulfophenyl)amino]-1,3,5-triazin-2-yl]amino]-, tetasodium salt; 9,9'-biacridinium, 10,10'-dimethyl-, dinitrate; 1-deoxy-1-(3,4-dihydro-7,8-dimethyl-2,4-dioxobenzo[g]pteridin-10(2H)-yl)-ribitol; mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4-amino-3-hydroxy-1- naphthalenesulfonic acid; 6-amino-4-hydroxy-2-naphthalenesulfonic acid; 7-amino-1,3-naphthalenesulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; C.I. Fluorescent Brightener 191; C.I. Fluorescent Brightener 200; benzenesulfonic acid, 2,2'-(1,2-ethenediyl)bis[5-(4-phenyl-2H-1,2,3-triazol-2-yl)-, dipotassium salt; benzenesulfonic acid, 5-(2H-naphtho[1,2-d]triazol-2-yl)2-(2-phenylethenyl)-, sodium salt; 1,3,6,8-pyrenetetrasulfonic acid, tetrasodium salt; pyranine; quinoline; 3H-phenoxazin-3-one, 7-hydroxy-, 10-oxide; xanthylium, 9-(2,4-carboxyphenyl)3,6-bis(diethylamino, chloride, disodium salt; phenazinium, 3,7-diamino-2,8-dimethyl-5-phenyl-, chloride; C.I. Fluorescent Brightener 235; benzenesulfonic acid, 2,2'-(1,2-ethenediyl)bis[5-[[4[bis(2-hydroxyethyl)amino]-6-[(4-sulfophenyl)amino]-1,3,5-triazin-2-yl]amino]-, tetrasodium salt; benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt; xanthylium, 3,6-bis(diethylamino)9-(2,4-disulfophenyl)-, inner salt, sodium salt; benzenesulfonic acid, 2,2'-1,2-ethenediyl)bis[5-[[4-[(aminomethyl)(2-hydroxyethyl)amino]-6-(phenylamino)-1,3,5-triazin-2-yl]amino]-, disodium salt; Tinopol DCS; benzenesulfonic acid, 2,2'-([1,1'-biphenyl]-4,4'-diyldi-2,1-ethenediyl)bis-, disodium salt; benzenesulfonic acid, 5-(2H-naphtho[1,2-d]triazol-2-yl)-2-(2-phenylethenyl)-, sodium salt; 7-benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof.

17. The method of claim 12 wherein the inert tracer is measured in an amount ranging from about 5 ppt to about 1000 ppm.

18. A method of monitoring and controlling a reverse osmosis membrane separation process including a reverse osmosis membrane capable of removing solutes from a feed stream for use in an industrial process wherein said monitoring substantially consists of:

adding at least one inert tracer to the feed stream;

contacting the reverse osmosis membrane with the feed stream, separating the feed stream into a first effluent stream and a second effluent stream to remove solutes from the feed stream;

providing at least one fluorometer to detect the fluorescent signal of the inert tracer in at least one of the feed stream, the first effluent stream and the second effluent stream;

using the at least one fluorometer to measure an amount of the inert tracer ranging from about 5 ppt to about 1000 ppm in at least one of the feed stream, the first effluent stream and the second effluent stream; and evaluating one or more process parameters specific to the reverse osmosis membrane separation process based on the measurable amount of the inert tracer.

19. The method of claim 18 wherein the process parameters are selected from the group consisting of operational parameters, chemical parameters, mechanical parameters, a percent recovery, a normalized permeate flow, a percent rejection, a differential pressure, a hydraulic holding time and combinations thereof.

20. The method of claim 18 wherein the inert tracer is measured in an amount ranging from about 1 ppb to about 50 ppm based on the amount of the inert tracer that is measured.

21. The method of claim 20 comprising controlling an amount of sealants and/or foulants depositing on the reverse osmosis membrane.

* * * * *